(12) United States Patent
Cai

(10) Patent No.: US 7,297,291 B1
(45) Date of Patent: Nov. 20, 2007

(54) STRESS STABILIZED FERRIMAGNETIC MATERIAL AND METHOD OF MANUFACTURE

(75) Inventor: Weilong Cai, Rochester, NY (US)

(73) Assignee: Ferronics, Incorporated, Fairport, NY (US)

(*) Notice: Subject to any disclaimer, the term of this patent is extended or adjusted under 35 U.S.C. 154(b) by 201 days.

(21) Appl. No.: 10/916,034

(22) Filed: Aug. 11, 2004

(51) Int. Cl.
  *C04B 35/26* (2006.01)
  *C04B 35/38* (2006.01)
  *C04B 35/64* (2006.01)

(52) U.S. Cl. .............. 252/62.62; 264/611; 264/232; 264/233; 264/340; 264/341

(58) Field of Classification Search ........... 252/62.62; 264/611, 232, 233, 340, 341, 610, 40.1
See application file for complete search history.

(56) References Cited

U.S. PATENT DOCUMENTS 5,645,774 A * 7/1997 Reczek et al. ............ 264/40.1
5,648,015 A   7/1997 Reczek
6,056,890 A * 5/2000 Cai et al. ................. 252/62.56

OTHER PUBLICATIONS

Erich Roess, Magnetic Properties and Microstructure of High-Permeability Mn—Zn Ferrites, FERRITES: Proceedings of the International Conference, Jul. 1970, pp. 203-209, Japan.

Effect of Divalent Ion Variation, Chemical Aspects of Ferrites, at least as early as Aug. 11, 2004, pp. 95-96.

1) Ferrite Kilns and 2) Firing of Microwave Ferrites and Garnets, Modern Ferrite Technology, Ferrite Processing, at least as early as Aug. 11, 2004, pp. 172-175.

* cited by examiner

*Primary Examiner*—C. Melissa Koslow
(74) *Attorney, Agent, or Firm*—Brian B. Shaw, Esq.; Michael J. Didas, Esq.; Harter Secrest & Emery LLP

(57) ABSTRACT

A stress stabilized ferrimagnetic material has a retained stress to provide enhanced initial permeability stability over a range of operating temperatures, such as from −40° C. to 85° C., as well as pressures. Stress is introduced into the ferrimagnetic material, wherein subsequent processing relieves only a portion of the induced stress, and preferably less than 50% of the induced stress.

15 Claims, 15 Drawing Sheets

STRESS STABILIZED FERRIMAGNETIC MATERIAL AND METHOD OF MANUFACTURE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to ferrimagnetic materials, and more particularly to a stress stabilized ferrimagnetic material having improved stability of initial permeability throughout a relatively wide range of temperature and external pressure, and a method of manufacturing the stress stabilized ferrimagnetic material.

2. Description of Related Art

In the telecommunications field, the use of relatively high permeability ferrimagnetic materials, in the range of 5,000 to 20,000 is required in a number of systems. However, the operating environments for these telecommunication systems are subject to substantial variances. For example, the temperature surrounding the telecommunication system can range from −40° C. to 85° C.

The initial permeability ($\mu_i$) of soft ferrite materials is sensitive to stress and temperature. In existing ferrimagnetic materials, a 40° C. temperature fluctuation can result in more than a 20% variance of initial permeability ($\mu_i$). Such variance typically limits or precludes operation of the device incorporating the ferrimagnetic material. In addition, conventional ferrimagnetic materials have an initial permeability of less than 5,000 at −40° C. Specifically, it has been found that at low temperatures, initial permeability substantially decreases, which can adversely affect an operating characteristic of the ferrimagnetic component, which in turn can jeopardize the link in a surrounding communications network.

Further, manufacturing processes can subject the ferrimagnetic materials to external stresses, pressures or loading. These external pressures are often associated with operably installing the ferrimagnetic component in a system and can also adversely affect the initial permeability of the ferrimagnetic materials, and lead to unacceptable performance characteristics.

The influences from the external stress and temperature appear to be unavoidable in both packaging and operating environments. Also, smaller ferrimagnetic packages and incorporation of ferrimagnetics into connector modules force a minimization of the ferrimagnetic materials. Potting and molding techniques as well as flow and reflow soldering are now employed for operably packaging the ferrimagnetic materials. These packaging techniques can cause a significant drop in the initial permeability of the ferrimagnetic material. It is believed these drops in initial permeability can be as much as 60% of the engineered nominal value. Conventional ferrimagnetic materials do not work well under these conditions.

Therefore, the need exists for ferrimagnetic materials that can provide more consistent initial permeability across greater temperature ranges. The need also exists for ferrimagnetic materials that can maintain a initial permeability within acceptable ranges, while withstanding external pressures and loading, such as associated with manufacture and installation.

BRIEF SUMMARY OF THE INVENTION

The present invention provides a stress stabilized ferrimagnetic material having an increased stability of initial permeability with respect to temperature fluctuations and external pressure. The present invention provides a ferrimagnetic material having an imparted stress, wherein a sufficient amount of the stress is retained to provide increased stability of initial permeability in response to temperature fluctuations and external stresses. The present invention also encompasses a method of forming such a stress stabilized ferrimagnetic material, wherein the stress stabilized ferrimagnetic material can exhibit a predetermined finished initial permeability.

As used herein, the term "ferrimagnetic material" encompasses those materials characterized by abnormally high initial permeability, definite saturation point and appreciable residual magnetism and hysteresis, as well as a subset of materials formed by treating hydrated ferric oxide with an alkali or by heating ferric oxide with a metallic oxide. The term "initial permeability" is the relative permeability at low excitation levels, and is generally understood as the limiting value of B/H where B is indefinitely close to zero (B=0) along the initial magnetization curve of a ferrimagnetic material, that is $$\mu_i = \text{limit}\frac{B}{H} \text{ as } B \to 0.$$

The stress stabilized ferrimagnetic material has improved stability of initial permeability with respect to temperature, external loading such as pressure and external stress.

In one configuration, the ferrimagnetic material is composed to yield a relatively high initial permeability after sintering. Subsequently, mechanical stress is imparted to the sintered ferrimagnetic material, such as by tumbling, thereby reducing the initial permeability to a tumbled initial permeability. That is, the initial permeability decreases by a suppression amount. A limited portion of the imparted stress is then relieved, such as by a controlled acid wash. The relief of a portion of the imparted stress causes the initial permeability to increase. Preferably, at least one half of the suppression amount of initial permeability is retained in the ferrimagnetic material. That is, sufficient stress is retained in the acid washed ferrimagnetic material so that the finished initial permeability is less than the sintered initial permeability by at least one half of the suppression amount. For example, if the sintered initial permeability is 20,000 and the tumbled (or minimum) initial permeability is 7,000, the suppression amount is thus 13,000. Preferably, less one-half the suppression amount is relieved. Thus, less than 3,500 perm is restored to the 7,000 perm tumbled material to provide a finished initial permeability of 10,500 or less. In selected configurations, the suppression amount can be (i)

greater than one half the maximum (or sintered) initial permeability and/or (ii) greater than the finished initial permeability.

BRIEF DESCRIPTION OF THE SEVERAL VIEWS OF THE DRAWING(S)

DETAILED DESCRIPTION OF THE INVENTION

Generally, the present invention includes a method of forming a ferrimagnetic material, wherein the material has a sufficient retained stress to provide selected predetermined performance characteristics. These representative characteristics, include but are not limited to, enhanced minimum initial permeability at reduced temperatures, such as −40° C., and reduced loss of initial permeability under external pressure.

Broadly-stated, the present ferrimagnetic material is sintered to as high an initial permeability as possible. A stress is imparted to the sintered material to depress the sintered initial permeability by a suppression amount. Subsequently, a limited portion of the imparted stress is relieved to provide a retained stress in the material, wherein the retained stress is preferably at least 50% of the imparted stress. That is, at least 50% of the suppression amount of initial permeability is not recovered.

Figure 1:
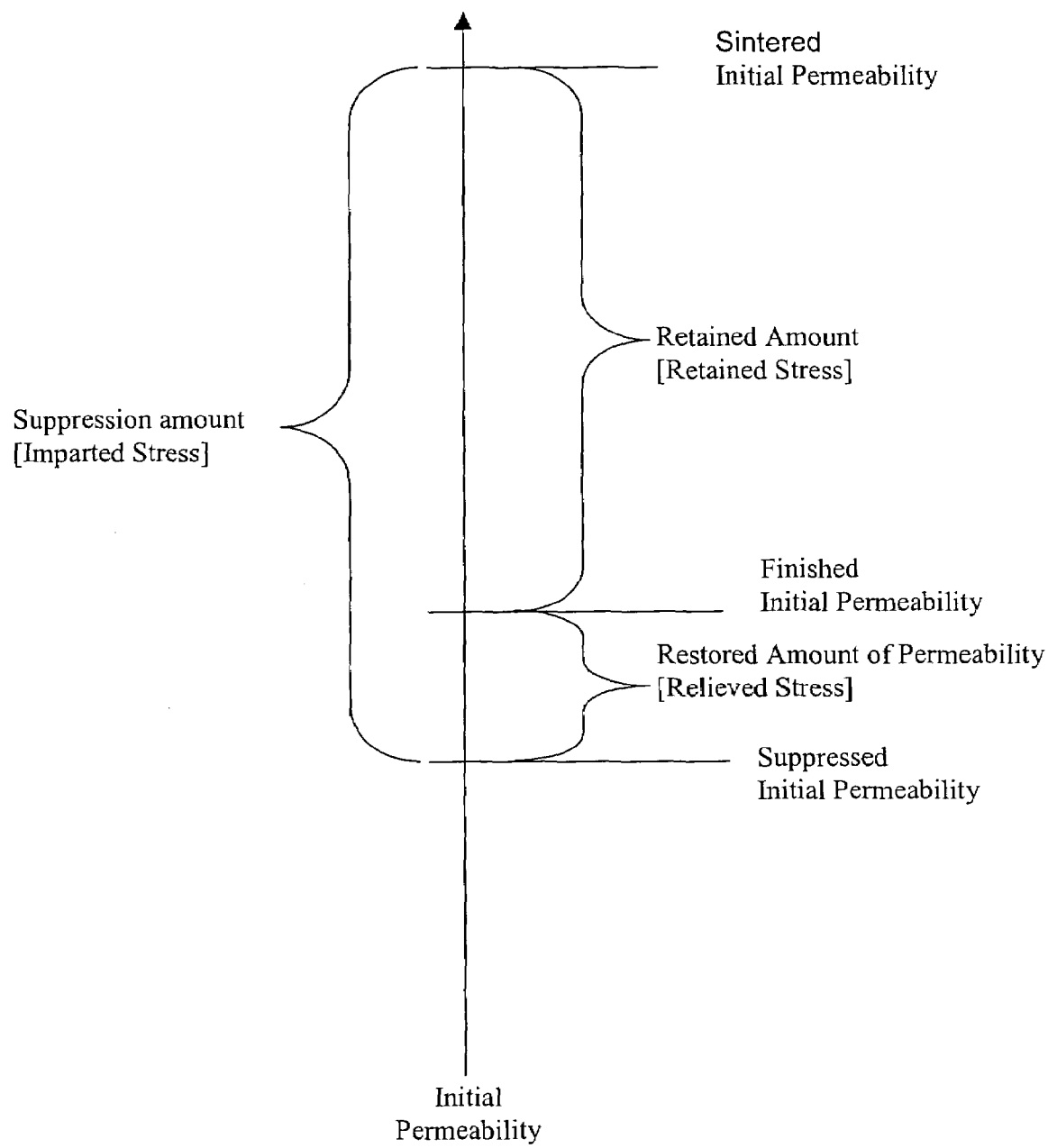
FIG. 1 is a graph showing the relative initial permeabilities of the sintered, suppressed, imparted and retained stress in the ferrimagnetic material.

Referring to FIG. 1, the ferrimagnetic material has a sintered initial permeability, the highest initial permeability in the process. Subsequently, stress is imparted to the ferrimagnetic material to reduce the sintered (maximum) initial permeability by a suppression amount to a suppressed (minimum) initial permeability. A portion of the imparted stress is then relieved in a controlled manner to raise the initial permeability by a restored amount, thereby providing the ferrimagnetic material with a finished initial permeability. The suppression amount of initial permeability minus the restored amount of initial permeability equals an amount of retained initial permeability. The present stress stabilized ferrimagnetic material has a retained stress which reduces or suppresses the finished initial permeability from a sintered initial permeability by at least half of the suppression amount.

Figure 2:
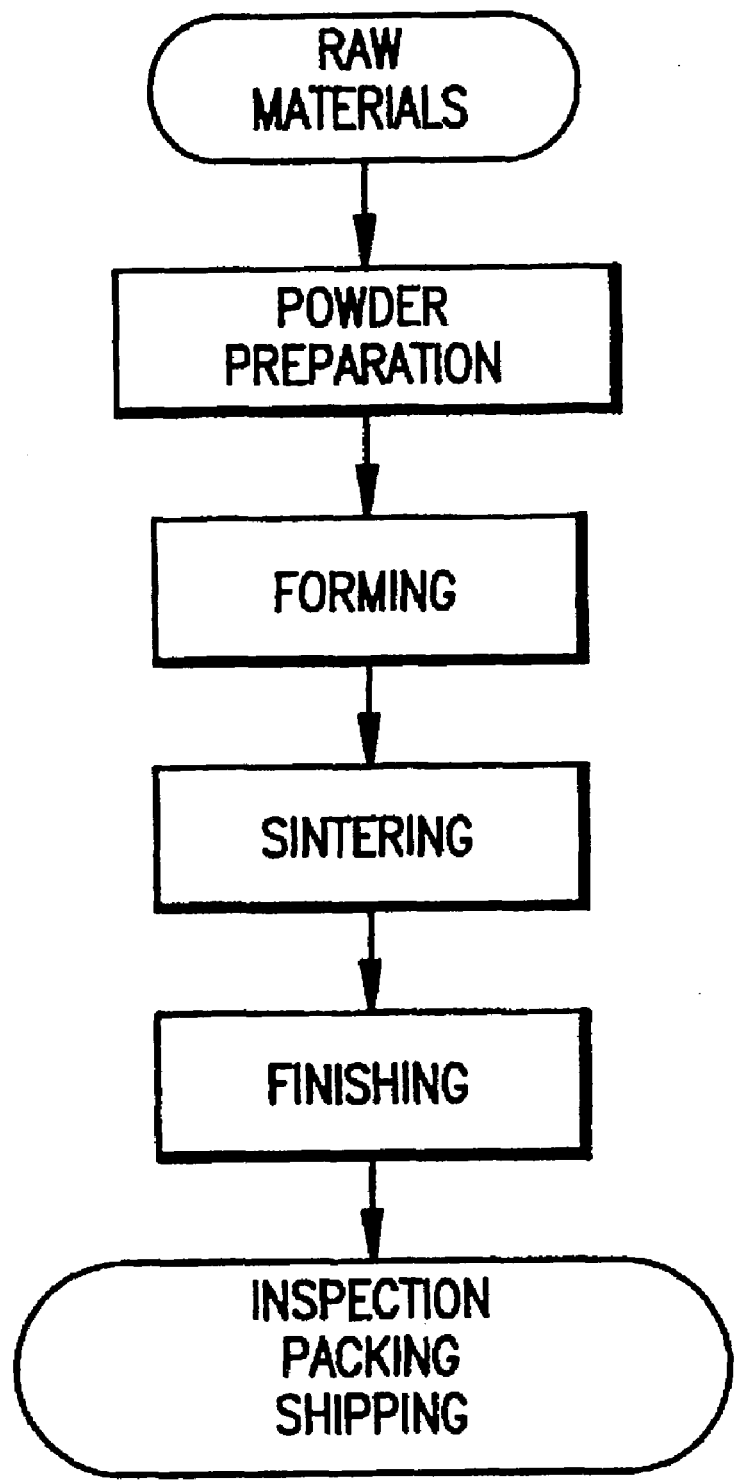
FIG. 2 is a processing flow diagram for the manufacture of the stress stabilized ferrimagnetic material.

Ferrimagnetic materials are manufactured by processing a composition of iron oxide mixed with other major constituents such as oxides or carbonates of either manganese and zinc or nickel and zinc. Referring to FIG. 2, the basic process common to most ceramic process technologies and can be divided into four major steps (1) preparation of the powder; (2) forming the powder into parts; (3) firing or sintering; and (4) finishing the ferrite component.

Figure 3:
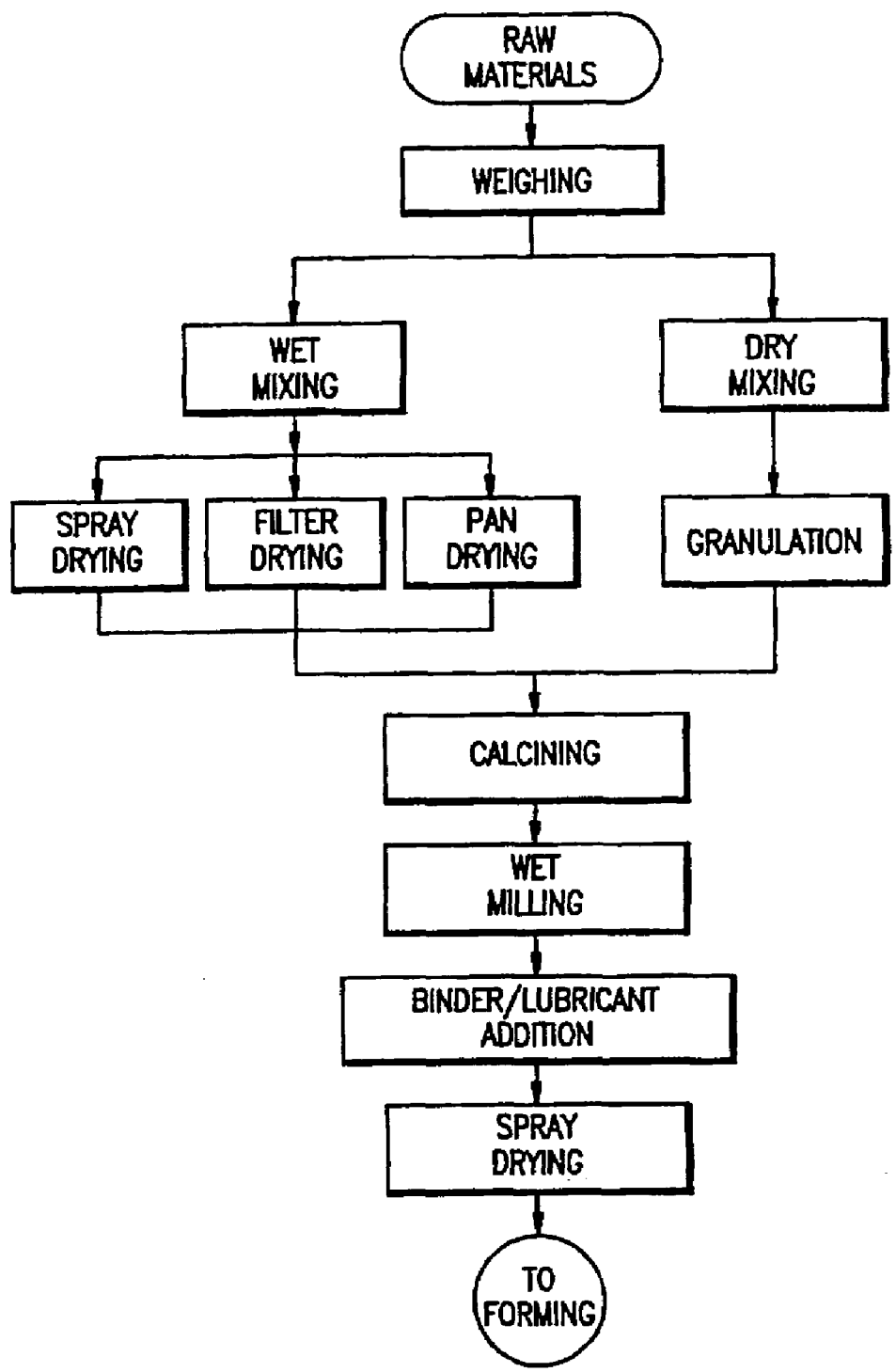
FIG. 3 is a powder preparation chart showing the preparation of the base material.
Figure 4:
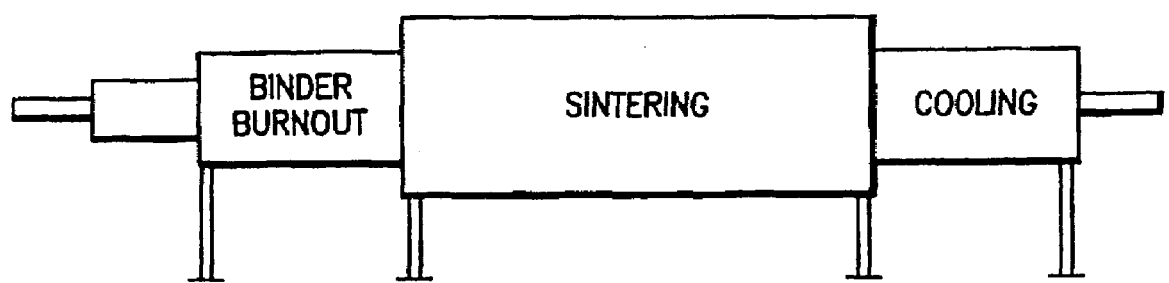
FIG. 4 is a schematic representation of a sintering device.

Referring to FIG. 3, a typical ferrite powder processing flow diagram is shown. The first step in the preparation of the powder starts with the chemical analysis of the raw materials, the oxides (or carbonates) of the major constituents. The impurities of these materials contributes directly to the quality of the final product and needs to be controlled to assure batch consistency. Preferably, the purity is at least 99.5% and further impurities are suppressed as much as possible. For example, excessive silica in manganese-zinc ferrite will severely limit the obtainable permeability.

Figure 7:
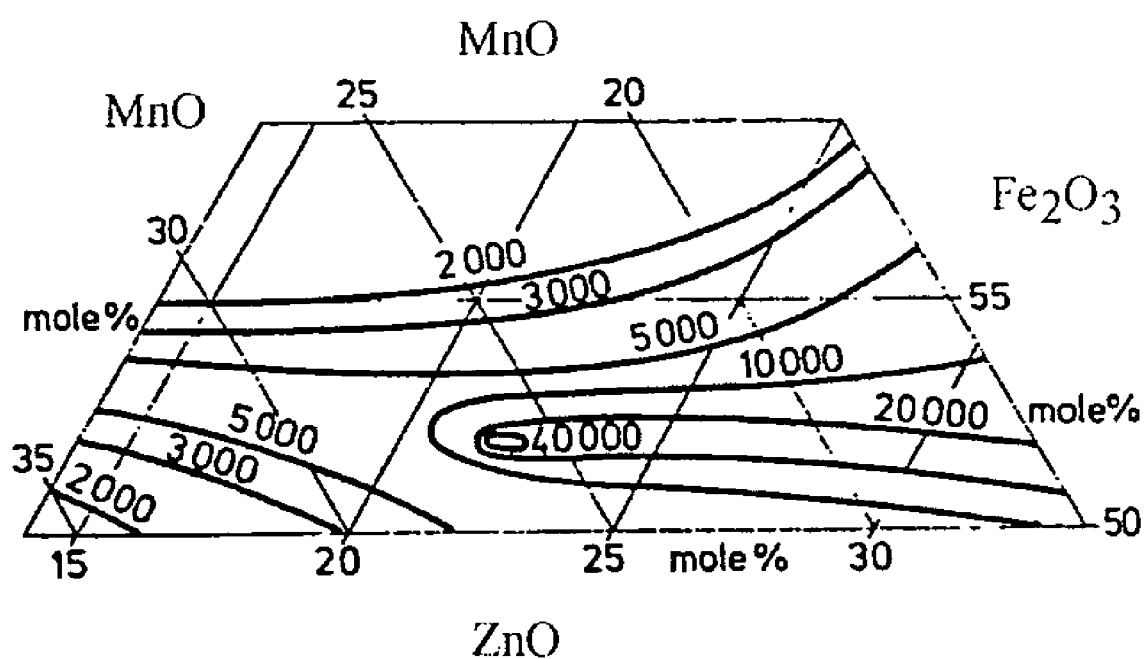
FIG. 7 is a miscibility diagram showing initial permeability of Mn—Zn ferrites.
Figure 8:
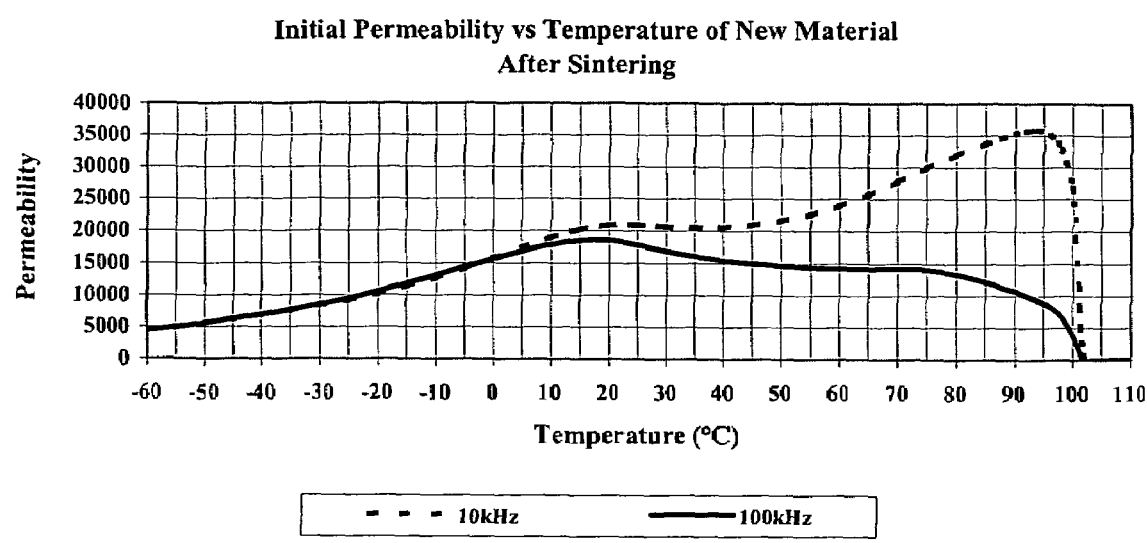
FIG. 8 is a graph of initial permeability, at 10 kHz and 100 kHz, as a function of temperature for the present ferrimagnetic material after sintering.
Figure 9:
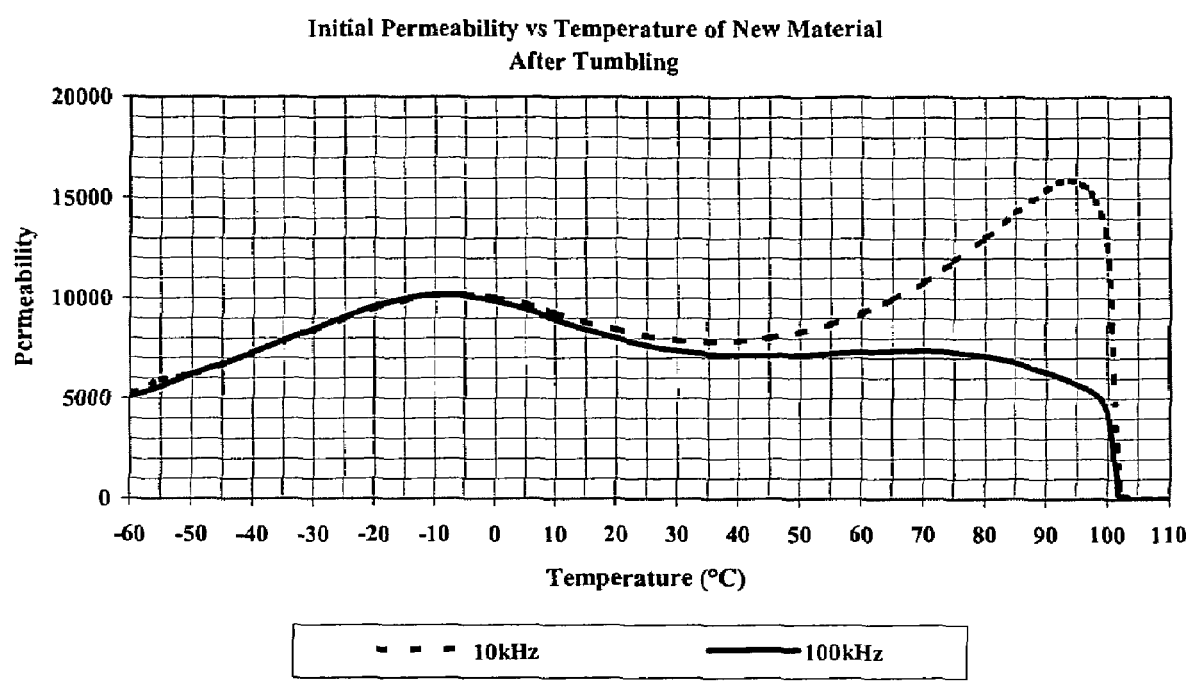
FIG. 9 is a graph of initial permeability, at 10 kHz and 100 kHz, as a function of temperature for the present ferrimagnetic material after tumbling (imparting stress).
Figure 10:
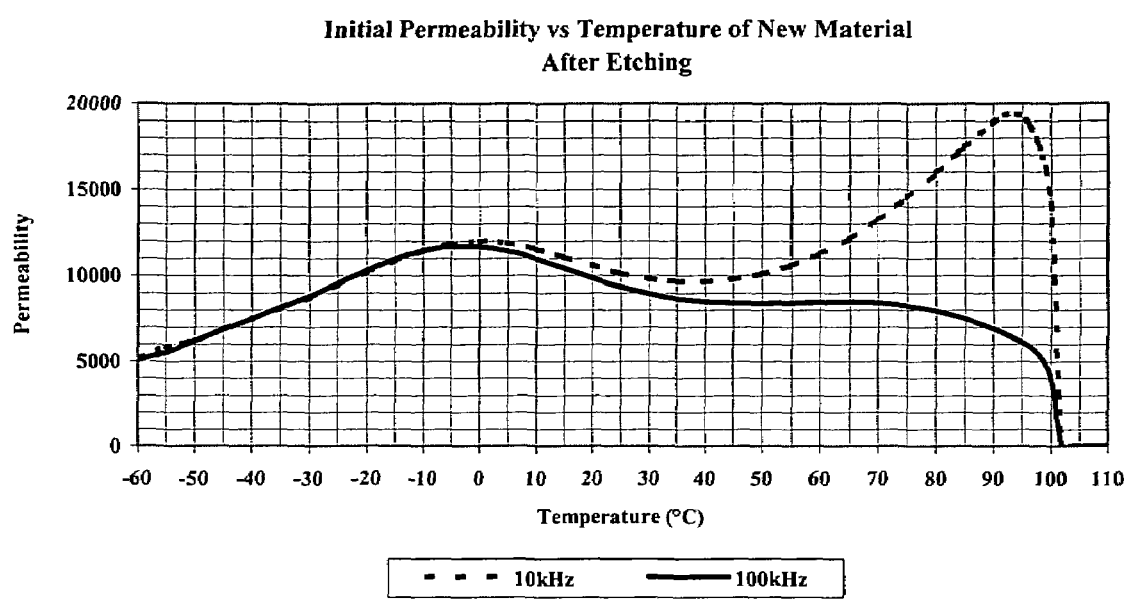
FIG. 10 is a graph of initial permeability, at 10 kHz and 100 kHz, as a function of temperature for the present ferrimagnetic material after etching (partial relief of stress).
Figure 11:
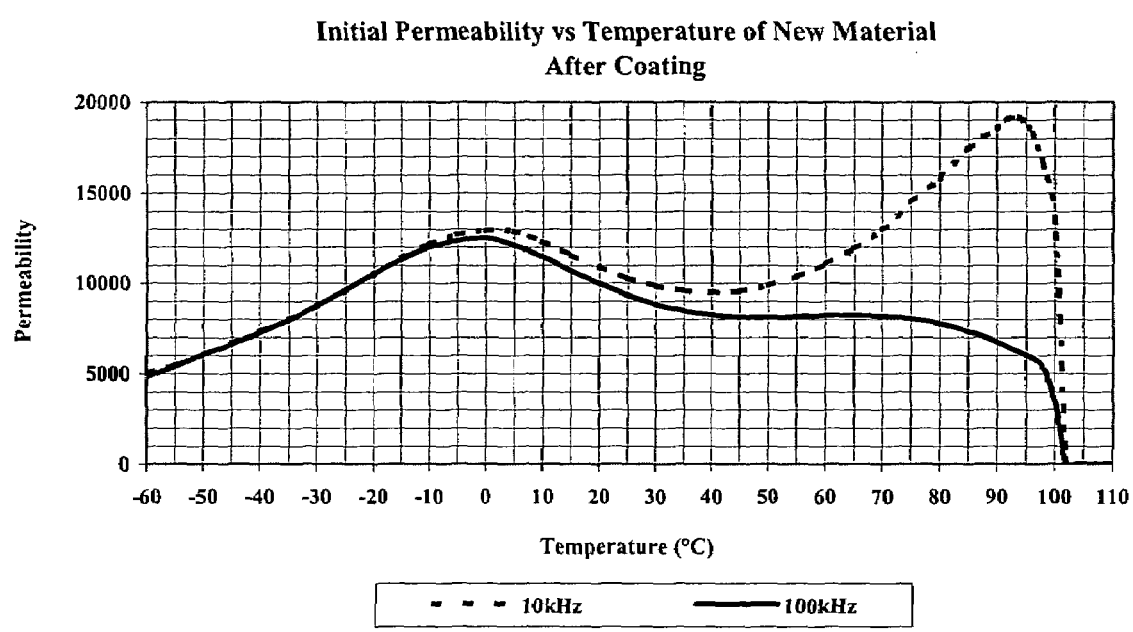
FIG. 11 is a graph of initial permeability, at 10 kHz and 100 kHz, as a function of temperature for the present ferrimagnetic material after coating.
Figure 12:
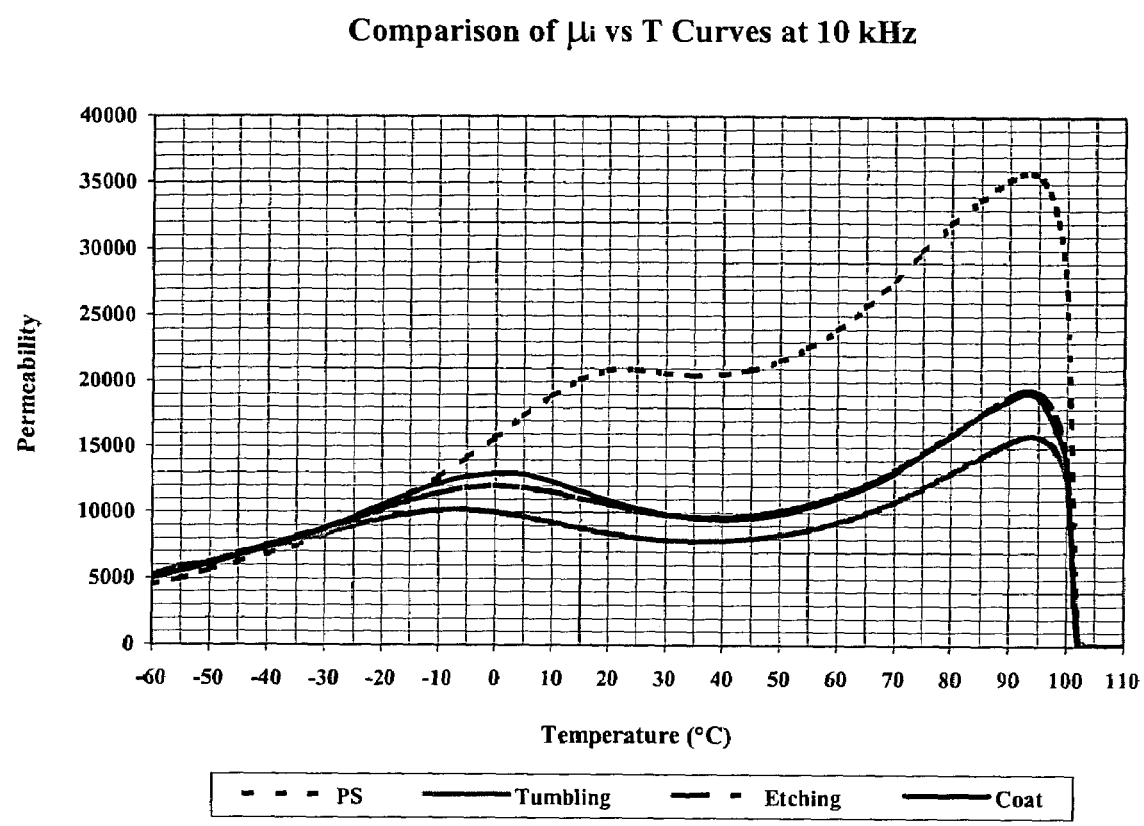
FIG. 12 is a composite graphical representation of the initial permeability at 10 kHz as a function of temperature for post-sintering, after tumbling (imparting stress), after partially relieving stress and after coating.
Figure 13:
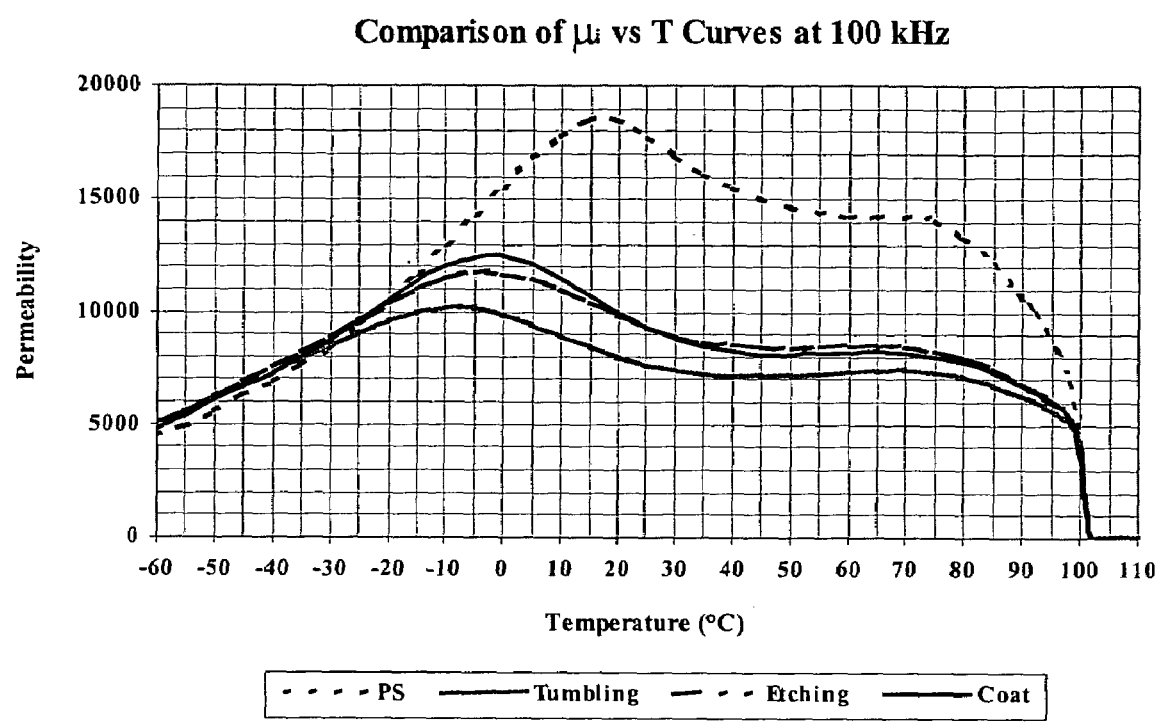
FIG. 13 is a composite graphical representation of the initial permeability at 100 kHz as a function of temperature for post-sintering, after tumbling (imparting stress), after partially relieving stress and after coating.
Figure 14:
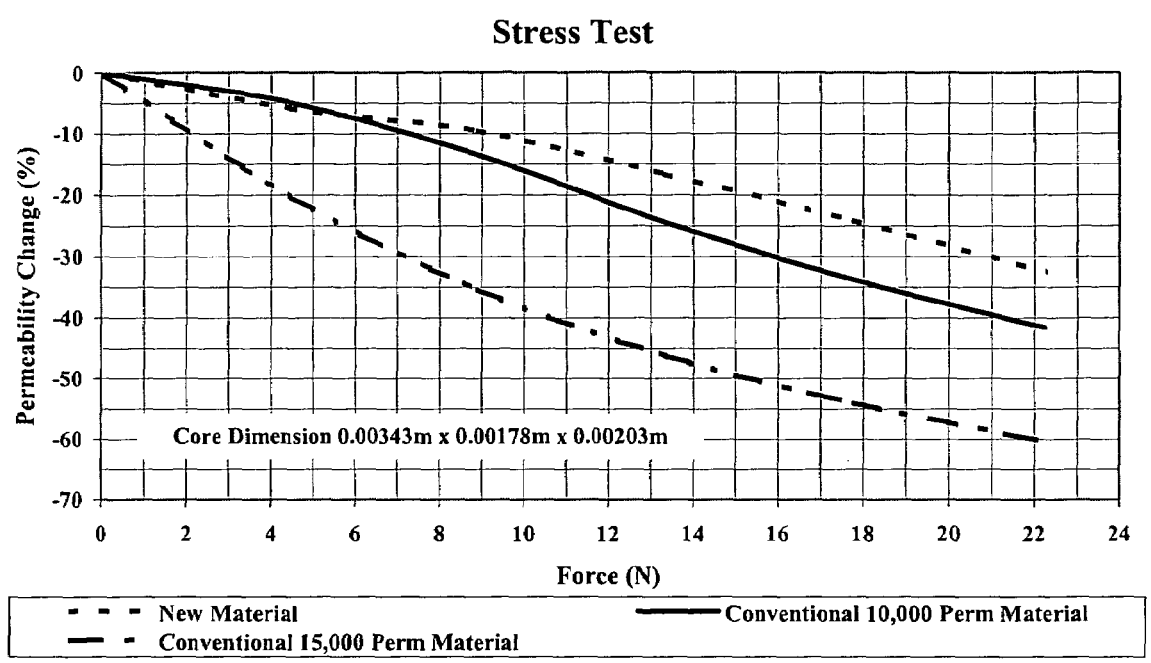
FIG. 14 is a graph showing initial permeability of a first ferrimagnetic material body as a function of pressure for conventional materials and the present material.
Figure 15:
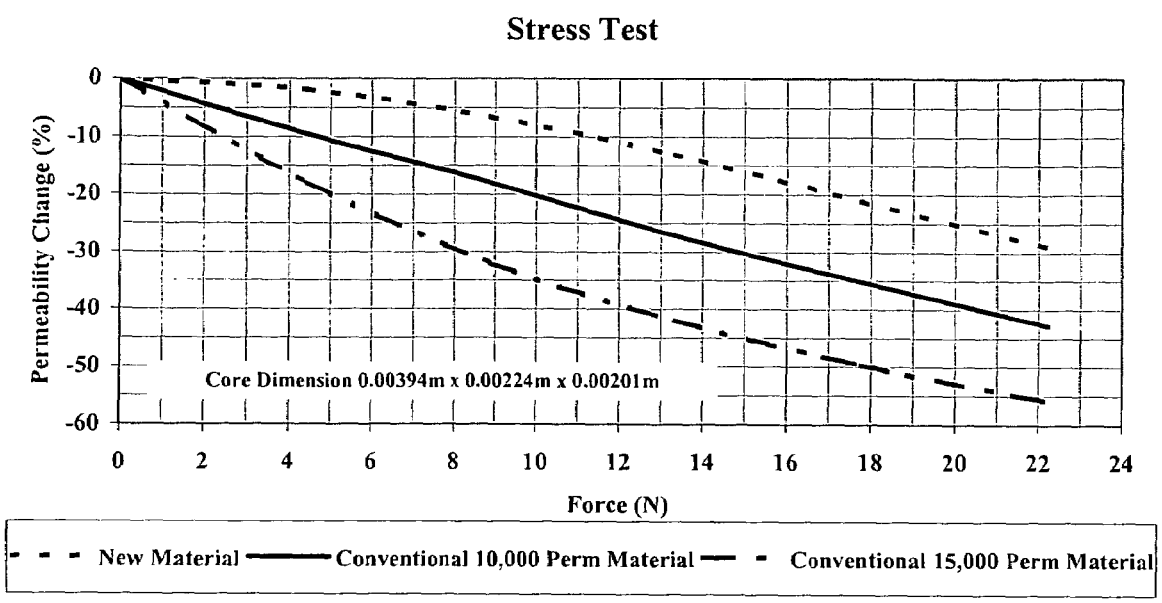
FIG. 15 is a graph showing initial permeability of a second ferrimagnetic material body as a function of pressure for conventional materials and the present material.

Generally, the ferrite powder is selected to provide as high an initial permeability as possible. That is, if the final initial permeability is desired to be approximately 10,000 perm, the ferrite powder is selected to provide a sintered initial permeability of at least approximately 20,000, and preferably 22,000. Referring to FIG. 7, there is a range of compositions that can be employed depending upon the desired resulting product. A representative composition of powders is 52 mol % $Fe_2O_3$, 24 mol % MnO and 24 mol % ZnO.

The exact amount of the major constituents is weighed and thoroughly mixed into a homogeneous mixture. The chemical composition is kept within tolerance of approximately 0.1% to achieve desired initial permeabilities. A typical tolerance is approximately 0.1%. The mixture of the major constituents can be done in a mixed oxide process, a dry process or water can be added to form a slurry and then mixed in a ball mill. When wet mixing is used, a drying procedure is required to reduce the moisture content prior to calcining.

The mixture is then calcined, a prefiring process, in which the powder temperature is raised to approximately 1000° C. in an air atmosphere. During the calcining, there is a partial decomposition of the carbonates and oxides, evaporation of the volatile impurities in a homogenization of the powder mixture. There is a degree of spinel conversion during calcining and this prefiring step also reduces the shrinkage in the final sintering process.

After calcining, the powder is mixed with water and the slurry is ball milled to obtain small and uniform particle sizes. The powder mixture is preferably pulverized to approximately 1 μm. At this stage, the process binders and lubricants are added. The type of binder and lubricant is determined by the specific requirements of the finished product. The moisture content, flowability, and particle size distribution are controlled to insure the integrity of the part.

The last step in the powder preparation is to spray dry the slurry in a spray dryer.

Forming the Powder into Parts

The second step in ferrite processing is forming the component or part. The most commonly used technique is dry pressing the powder into the part configuration. Other techniques are extruding and isostatic pressing. Dry pressing or compacting is done using a combined action of a top and bottom punch in a cavity such that uniform density in the part is obtained. The commercially available presses and tooling technology enable the pressing of multiple parts in very complex core shapes. The parts can be any of variety of shapes such as pot cores, RM cores, solid center post RM cores, E cores, U cores, EP cores, toroids, multi-aperture cores, rods, tubes, strips and EMI cores. Sintering shrinkage is a function of the density of the green (unsintered) part, the press density is controlled in order to achieve a desired sintered dimension. Further, green density uniformity must be controlled over the entire volume of a pressed part to prevent distortion upon sintering such as warpage of the E Core legs, or cracked cores.

Sintering

Figure 5:
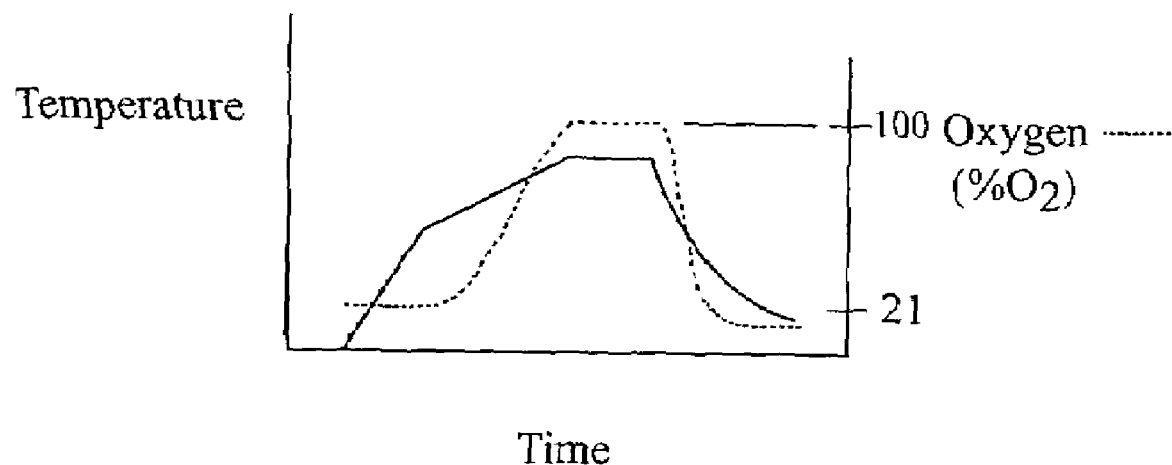
FIG. 5 is a graph showing a representative sintering cycle.

The sintering is a conversion step in the manufacturing of the ferrimagnetic materials. During the sintering phase, the product acquires its magnetic and mechanical characteristics. Sintering includes heating the parts in a kiln or oven. The specific temperature profile and environment in which the sintering occurs depends on the specific part and composition of the ferrite. As shown in FIG. 5, the temperature and atmosphere are varied throughout the sintering process.

The sintering of MnZn ferrites requires a relationship between time, temperature and atmosphere along each phase of the sintering cycle. Sintering starts with a gradual ramping up from room temperature to approximately 800° C. as impurities, residual moisture, binders, and lubricants are burned out of the product. The atmosphere in this part of the sintering cycle is air.

The temperature is further increased to the final sinter temperature of approximately 1000°-1500° C., depending on the type material, and for the given example, 1380° C. While the temperature is decreasing, a non oxidizing gas, such as nitrogen, is introduced into the kiln to reduce the oxygen content of the kiln atmosphere. During the cool-down cycle, a reduction of oxygen pressure is very critical in obtaining high quality MnZn ferrites.

Generally, the oxygen—temperature relationship for sintering satisfies the relation is:

$$\log P_{O_2} = -\frac{14540}{T} + 9.2;$$

where $P_{O_2}$ is the partial pressure of oxygen and T is the temperature in Kelvin.

During sintering, the parts shrink to their final dimensions. Different material and processing techniques result in variance in this shrinkage, but typical linear shrinkage ranges from 10 to 20% of the formed dimensions. The final part dimensions can be held to mechanical tolerances of +/−0.2% of the nominal part dimensions.

As a result of sintering, the parts achieve their highest initial permeability. In the present method, the permeability after sintering is substantially higher than a finished permeability of the ferrimagnetic material. Preferably, the sintered initial permeability is at least 1.5 times the desired/finished initial permeability and more preferably, at least twice the finished initial permeability.

Suppression of Initial Permeability

A stress is imparted to the sintered material to substantially reduce the initial permeability. In certain configurations, a sufficient amount of stress is imparted to reduce the initial permeability by at least 50% of the sintered initial permeability.

The sintered ferrimagnetic material, as parts, are tumble processed to impart sufficient stress in the material to reduce the initial permeability of the parts. The parts are tumbled in a flowable medium such as grit, sand, or spheres or particles of ceramic, glass, sand, or metal. The tumbling media and tumbling parameters are dictated by the composition of the part, the part size and the necessary depression of the permeability.

Generally, the initial permeability is reduced from the sintered initial permeability by a suppression amount, to achieve a suppressed or tumbled initial permeability. In certain configurations, the tumbling is carried out until the initial permeability of the parts has been reduced by a suppression amount which is greater than the finished initial permeability. That is, if the finished permeability is 10,000, then the suppression amount is at least 10,000, such as from approximately 19,000 to 8,000, or 21,000 to 8,000.

In one configuration, the imparted stress is sufficient to increase the initial permeability below a given temperature. For example, it has been found that initial permeability can actually increase upon imparting stress, for temperature ranges below −30° C. However, for temperature ranges from approximately 0° C. to 100° C., the imparted stress reduces the initial permeability, and can reduce the initial permeability by a suppression amount that is greater than the finished initial permeability, or at least one0half the sintered (maximum) initial permeability.

Figure 6:
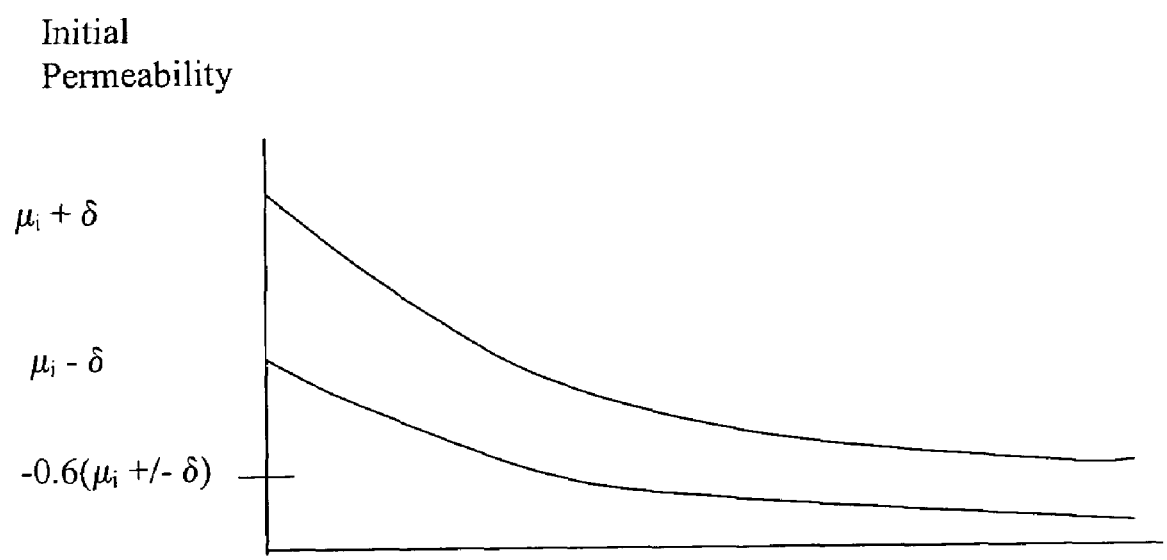
FIG. 6 is a graph showing the relation of tumbling time to initial permeability.

Referring to FIG. 6, the dependence of initial permeability on tumbling decreases in time, and especially after the permeability has been suppressed to approximately 50% to 60% of the original sintered value. In one configuration, the induced stress reduces the sintered initial permeability of the ferrimagnetic material by at least 60%. By suppressing the initial permeability to less than approximately half of the sintered initial permeability and preferably by the suppression amount being greater than the finished initial permeability, a substantial stress is imparted to the ferrimagnetic material.

Setting the Initial Permeability to the Finished Value

The sintered and tumbled parts having an initial permeability below the finished permeability are then exposed to a chemical wash. The chemical wash is preferably an acid wash. Muriatic, phosphoric, nitric and sulphuric acids may be used. The preferred acid is hydrochloric acid at room temperature and at approximately 36% concentration. The exposure of the tumbled parts to the acid wash releases a limited portion of the imparted stress in the ferrimagnetic material, thereby increasing the initial permeability of the parts. The length of exposure of the parts to the chemical wash is monitored so that the wash is terminated upon the parts reaching the finished initial permeability.

If the acid wash is terminated prematurely, the wash may be reinstated to continue restoring the initial permeability to the finished value. Conversely, if the acid wash is carried on past the finished initial permeability, the parts can be retumbled to suppress the initial permeability below the finished initial permeability and the parts rewashed to obtain the finished initial permeability.

The monitoring of the parts in the acid wash can be achieved in a variety of ways. Specifically, three small samples of a batch of tumbled parts are separated from the remaining batch. The first sample is exposed to the acid wash for two minutes; the second sample is exposed to the acid wash for five minutes and the third sample exposed to the acid wash for ten minutes. The initial permeability via the inductance of each sample is measured and plotted on a graph of inductance (initial permeability) v. time. Then from the graph, the chemical wash time to obtain the finished initial permeability is determined and the remaining portion of the batch is exposed to the chemical wash for that period of time.

It is understood the actual test times may vary depending upon the specific acid wash and the configuration of the part. The times are selected so that one subset exposure sets an initial permeability less than the finished permeability and another subset exposure sets an initial permeability greater than the finished permeability.

Alternatively, a sample of the batch may be strung on a single wire and the sample and remainder of the batch placed in the acid wash. As the measured inductance relates to the initial permeability by the formula $$L = 2\mu_i h \ln\frac{O.D.}{I.D.} 10^{-9}$$

where L is the inductance in Henries; $\mu_i$ is the initial permeability; h is the height in centimeters; O.D. is the outer diameter and I.D. is the inner diameter of the part, the initial permeability can be continuously monitored by continuously monitoring the inductance.

Upon the inductance reaching the level corresponding to the finished initial permeability, the parts are removed from the acid wash and rinsed with water to terminate further restoration of the initial permeability.

It is known that inductance is related to initial permeability by the above formula. Therefore, as the inductance of the sample parts is continuously monitored, the changing initial permeability may be monitored and stopped at the finished permeability. The specific time necessary for the restoration of the initial permeability depends upon a number of factors including the acid, the specific material of the ferrite; the amount the initial permeability is depressed by tumbling and the temperature of the acid. The continuous monitoring of the initial permeability (via the inductance) accommodates all the variable parameters. That is, by continuously monitoring the change in initial permeability, the resulting influence of a change in any of the parameters is accounted for in the duration of the wash.

The apparatus for implementing the present method includes a wash tub, a tray, and an inductance monitor. In an automated system, the apparatus further includes a controller and a lifter.

The wash tub is an acid resistant vessel. Similarly, the tray is acid resistant and is porous or vented to permit a free flow of acid into and out of the tray. The tray is connected to the lifter for selectively placing the tray in contact with the acid and out of contact with the acid. The lifter is also operable over a limited range to slightly oscillate the tray to induce a flow of acid across the parts.

The monitor is any of a variety of commercially available inductance meters such as HP-4284A LCR meter. The controller is a desktop computer operably connected to the lifter and the monitor. The controller receives signals from a monitor which represent the inductance of the monitored part(s), and translates the inductance to a corresponding initial permeability upon reaching an inductance value corresponding to the finished initial permeability. The controller directs the lifter to remove the tray from the acid wash and initiate a rinse of the parts in a rinse tub.

The setting of the initial permeability to the finished initial permeability is selected to retain a substantial portion of the induced stress and hence suppression amount of initial permeability within the ferrimagnetic material. Preferably, at least half of the suppression amount of initial permeability is not relieved. That is, at least half the induced stress is retained within the ferrimagnetic material. For example, if the induced stress reduces the sintered initial permeability by x perm, then less than 0.5x perm is recovered. Alternatively, at least 0.5x of the suppressed permeability is not restored. For example, if the induced stress (tumbling) reduces the sintered initial permeability by a suppression amount of 8,000 perm, then the setting of the finished initial permeability restores less than 4,000 perm. Thus, preferably, at least 50% (4,000 perm) of the suppression amount of initial permeability resulting from the induced stress is retained (not restored) after the finished initial permeability has been set.

Describing the differences in initial permeability as an amount of retained stress, assumes a linear relation of retained stress to initial permeability. While this assumption is made, it is understood the relation of retained (induced) stress to initial permeability can be non-linear. For purposes of description, linearity has been assumed between amount of retained stress and corresponding initial permeability. Therefore, the ferrimagnetic material is also described in terms of recovered permeability versus retained loss of initial permeability.

In a specific batch processing of the above MnZn ferrite, the powder formation and forming is accomplished as set forth. The parts were sintered at a temperature of 1380° C. to achieve a maximum initial permeability of approximately 19,000 to 21,000. For a desired finished initial permeability of 10,000, the sintered initial permeability is at least 1.5 times the finished initial permeability and up to 2 times the finished initial permeability. The sintered parts were then tumbled in a fine 60 grit sand in a ratio of 1 part media to two parts ferrites at 80 Rpm in a Harper tumbler. The Harper tumbler is a standard tumbler and rotates the parts about two axes. The ratio of tumbling media to parts may be varied between 1:1 to 1:3, however, a ratio of 1:2 is preferable. The tumbling occurs for approximately 3 to 4 minutes and suppresses the initial permeability to approximately 6,000 to 8,000. Thus, the suppression amount is between approximately 11,000 to 15,000, which is greater than the finished 10,000 initial permeability. That is, in certain configurations the suppression amount is either greater than the finished initial permeability or at least one half of the sintered (maximum) initial permeability. The tumbling also rounds the sharp edges of the sintered parts to enhance subsequent winding operations. Thus, sufficient stress is imparted to the ferrimagnetic material to reduce the sintered initial permeability by at least half and preferably less than approximately 40% of the sintered initial permeability.

A sample of the tumbled parts is strung onto a conductive wire and connected to the inductance monitor. In the present embodiment, a 26 gage wire having a length of approximately 7 feet is used to retain the sample parts for measuring inductance. The monitored parts and remaining portion of the batch are put in the tray and immersed in a hydrochloric acid of approximately 36% solution at room temperature. A sufficient amount of acid is employed to cover all the parts and permit a slight agitation so that a relatively uniform concentration of acid is exposed to the parts. Depending upon the age of the acid, the part configuration on the specific material, the wash time may be approximately 5 to 15 minutes. Upon the monitored inductance of the sample parts reaching a value corresponding to the finished permeability, such as 10,000 the entire batch of parts are removed from the chemical wash and immersed in the water tub and then rinsed with water. Thus, only approximately 2,000 to 4,000 perm has been restored, while the ferrimagnetic material retains a sufficient stress to suppress the initial permeability by 9,000 to 10,000 perm from the sintered initial permeability. Thus, the finished ferrimagnetic material has a retained stress, the retained stress being sufficient to lower the initial permeability from the sintered initial permeability by an amount that is greater than the permeability recovered from the minimum (tumbled) initial permeability.

The present process thereby allows adjustment of the initial permeability of a batch of parts. That is, if a given batch of parts has a given distribution profile of initial permeability about a given value which is greater than a finished value, the present invention allows the distribution profile of the batch to be shifted and accurately centered about the finished value.

The present process also accommodates variances in manufacturing of the sintered part. Specifically, for a given batch (common powder preparation, formation and sintering) fluctuations in parameters such as kiln temperature may result in an undesirably wide distribution of the parts about a given initial permeability. The selection of portions of the batch having a relatively narrow distribution about a given initial permeability (higher than the finished permeability) may be to center the distribution at the finished permeability. Therefore, by individually exposing separate sub batches (each sub batch having a narrow tolerance about a given initial permeability) to the stress relief, an entire batch can be manufactured to center the distribution about the finished permeability within the narrow tolerances of the sub batches.

By the present method, it has been found that the distribution of the initial permeability of parts having 10,000 perm may be shifted to within approximately +/−5% of the finished permeability.

The ability to establish an initial permeability in response to monitoring the change in the permeability, allows a greater accuracy of the final part. Further, the monitored adjustment of the initial permeability can accommodate uncontrollable, or even unintended variances in the formation of the sintered part.

The introduction of sufficient stress, and hence suppression of the initial permeability below the finished level and preferably to a relatively tumbling insensitive level, followed by the controlled and monitored restoration of a portion of the original sintered initial permeability and retention of sufficient stress such that at least 50% of the suppression amount is retained (permeability loss) exhibited by the ferrimagnetic material allows the present process to produce a ferrimagnetic material, wherein the center of the distribution of the initial permeability is within approximately .+/−0.5% of a desired finished initial permeability while providing enhanced thermal stability.

Alternatively stated, the stress stabilized ferrimagnetic material relieves only a portion of the imparted stress, such that less than 50% of the suppression amount of initial permeability is regained, and preferably less than 40% and in selected configurations less than 30% to approximately 20% or less. Thus, if the sintered ferrimagnetic material having a sintered initial permeability of 21,000 is tumbled to reduce the initial permeability by 12,000 to a tumbled (minimum) initial permeability of 9,000, the suppression amount is 12,000. Therefore, in certain configurations the suppression amount of initial permeability is greater than 10,000. Then less than 6,000, preferably less than 4,000 and in selected configurations less than 3,000, and in further configurations approximately 2,000 to 1,000 perm is restored, thereby leaving up to an 11,000 perm suppression from the value of the sintered initial permeability, to provide a finished initial permeability of approximately 10,000 perm.

The parts having the finished initial permeability and retained stress can then be finished by a coating with nylon, epoxy paint or parylene. Nylons and epoxy paints typically need a minimum coating thickness of approximately 0.005 inches to insure uniform protection. Because of this restriction, they are used mainly on toroids with an outer diameter of 0.500 inches or greater. One advantage of these coatings is that the color can be varied for core material identification without stamping.

The coating can be a hard coating which exerts addition stress or pressure on the part. As the ferrimagnetic material is stress stabilized, this additional coating stress does not adversely reduce the initial permeability.

By retaining at least 50% of the imparted stress (suppression amount of initial permeability), that is retaining a sufficient amount of imparted stress to provide the reduced amount of permeability is greater than the amount of restored permeability, the ferrimagnetic material offers substantial benefits.

The stress stabilized ferrimagnetic material exhibits an initial permeability of at least 5,000 at 10 kHz and 100 kHz across a temperature range from −50° C. to over 95° C. The resulting ferrimagnetic body can include a ferrimagnetic material having a sufficient retained induced mechanical stress to provide an initial permeability of at least 5000 at −40° C. Further, the ferrimagnetic body can include ferrimagnetic material having an initial permeability of at least 10,000 at 0° C.

Applied stresses often associated with installation of the cores formed of the ferrimagnetic material can be accommodated by the stress stabilized ferrimagnetic core. The ferrimagnetic material will exhibit a change of approximately 10% under a two to three pound loading, in contrast to a 20% to 30% change exhibited by prior ferrimagnetic materials. In one configuration, the ferrimagnetic material has sufficient mechanically induced stress to provide less than a 20% change in initial permeability when subject to a loading of less than or equal to three pounds. Thus, installation pressures such as reheating, IR solder reflow, molding and potting do not adversely effect the performance range of the present ferrimagnetic material.

Therefore, the present ferrimagnetic material can be wound or coated without adversely effecting performance.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

The invention claimed is:

1. A ferrimagnetic body, comprising:
   (a) a ferrimagnetic material having a sufficient retained induced mechanical stress to provide an initial permeability of at least 5000 at −40° C.

2. The ferrimagnetic body of claim 1, wherein the retained stress is sufficient to reduce the initial permeability by at least 10,000 from a sintered initial permeability.

3. The ferrimagnetic body of claim 1, wherein the ferrimagnetic material has an initial permeability of at least 10,000 at 0° C.

4. A stress stabilized ferrimagnetic body, comprising:
   (a) a ferrimagnetic material having sufficient mechanically induced stress to provide less than a 20% change in initial permeability when subject to a loading of less than or equal to three pounds.

5. A method of forming a stress stabilized ferrimagnetic body, comprising:
   (a) sintering a formed green body to provide a sintered initial permeability;
   (b) mechanically introducing sufficient stress to reduce the sintered initial permeability by a suppression amount, the suppression amount being at least 50% of the sintered initial permeability; and
   (c) exposing the stressed material to an acid wash to increase the initial permeability by less than half of the suppression amount to a finished initial permeability.

6. The method of claim 5, further comprising sintering the formed green material to a sintered initial permeability of at least twice the finished initial permeability.

7. A ferrimagnetic body having a stress stabilized initial permeability to temperature relationship, comprising:
   (a) a ferrimagnetic material retaining at least one half of an induced stress, the induced stress being sufficient to reduce a sintered initial permeability of the ferrimagnetic material by at least 50%.

8. The ferrimagnetic body of claim 7, wherein induced stress reduces the sintered initial permeability of the ferrimagnetic material by at least 60%.

9. A ferrimagnetic body having a stress stabilized initial permeability to temperature relationship, comprising:
   (a) a ferrimagnetic material retaining at least one half of a suppression amount of initial permeability.

10. The ferrimagnetic body of claim 9, wherein the suppression amount of initial permeability is greater than 10,000.

11. The ferrimagnetic body of claim 9, wherein the suppression amount of initial permeability is greater than a finished initial permeability of the ferrimagnetic material.

12. A ferrimagnetic body having a stress stabilized initial permeability to temperature relationship, comprising:
   (a) a ferrimagnetic material having a finished initial permeability, a difference between the finished initial permeability and a sintered initial permeability being greater than a difference between the finished initial permeability and a stress induced minimum initial permeability.

13. A ferrimagnetic body having a stress stabilized initial permeability to temperature relationship, comprising:
   (a) a ferrimagnetic material having a stress reduced finished initial permeability, wherein less than 50% of a stress induced suppression of a sintered initial permeability is relieved to provide the finished initial permeability.

14. The ferrimagnetic body of claim 13, wherein the recovered permeability is obtained in an acid wash of the ferrimagnetic material.

15. A method of manufacturing a stress stabilized ferrimagnetic material, the method comprising:
   (a) sintering an unsintered material to introduce a sintered initial permeability to the material;
   (b) mechanically imparting a stress to the sintered material to reduce the sintered initial permeability by a suppression amount; and
   (c) acid washing the mechanically stressed material to relieve a portion of the imparted stress to provide a finished permeability that is less than the sintered initial permeability by at least one half the suppression amount.

* * * * *